(12) United States Patent
Bruck et al.

(10) Patent No.: US 10,584,801 B2
(45) Date of Patent: Mar. 10, 2020

(54) VALVE, IN PARTICULAR PROPORTIONAL PRESSURE REGULATING VALVE

(71) Applicant: HYDAC FLUIDTECHNIK GMBH, Sulzbach/Saar (DE)

(72) Inventors: Peter Bruck, Althornbach (DE); Gerd Schneider, Dillingen (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 56 days.

(21) Appl. No.: 15/571,065

(22) PCT Filed: Jan. 15, 2016

(86) PCT No.: PCT/EP2016/000074
§ 371 (c)(1),
(2) Date: Nov. 1, 2017

(87) PCT Pub. No.: WO2016/180506
PCT Pub. Date: Nov. 17, 2016

(65) Prior Publication Data
US 2018/0163889 A1 Jun. 14, 2018

(30) Foreign Application Priority Data
May 9, 2015 (DE) .......................... 10 2015 006 099

(51) Int. Cl.
*F16B 13/04* (2006.01)
*F16K 11/07* (2006.01)
(Continued)

(52) U.S. Cl.
CPC ...... *F16K 31/0613* (2013.01); *F15B 13/0442* (2013.01); *F16K 11/0716* (2013.01);
(Continued)

(58) Field of Classification Search
CPC ....... Y10T 137/8671; Y10T 137/86702; Y10T 137/86574; Y10T 137/86622;
(Continued)

(56) References Cited

U.S. PATENT DOCUMENTS 6,422,533 B1 * 7/2002 Harms ................ F16K 31/0613
251/129.1
8,607,823 B2 * 12/2013 Fischer ............... F16K 11/0716
137/625.38

(Continued)

FOREIGN PATENT DOCUMENTS

DE 10 2004 025 969 12/2005
DE 10 2005 022 693 11/2006
(Continued)

OTHER PUBLICATIONS

International Search Report (ISR) dated May 2, 2016 in International (PCT) Application No. PCT/EP2016/00074.

*Primary Examiner* — Kevin F Murphy
*Assistant Examiner* — Kelsey E Cary
(74) *Attorney, Agent, or Firm* — Wenderoth, Lind & Ponack, L.L.P.

(57) ABSTRACT

A proportional pressure regulating valve has a spring-loaded valve piston (10) guided in and actuated by an actuating magnet (14) within a valve housing (12). Opposite valve piston sides are exposed to tank pressure. The valve piston (10) has a regulation surface (44) connectable to working port (A) for a regulation pressure (PR). A ring-shaped chamber (42) in the valve housing (10) opens into the working port (A). At the transition between the ring-shaped chamber (42) and the working port (A), the regulation surface (44) is active. When the actuating magnet (14) is deenergized, a maximum regulation pressure (PR) is generated.

14 Claims, 2 Drawing Sheets

(51) Int. Cl.
    *F16K 31/06* (2006.01)
    *F15B 13/044* (2006.01)
    *F15B 13/00* (2006.01)
    *F15B 13/04* (2006.01)
(52) U.S. Cl.
    CPC ..... *F15B 13/0407* (2013.01); *F15B 2013/004* (2013.01); *F15B 2013/041* (2013.01)
(58) Field of Classification Search
    CPC ............ F16K 31/0613; F16K 11/0716; F16K 11/0708; F16K 11/065; F16K 11/07; F15B 13/0442
    USPC ............ 137/625.69, 625.68, 625.65, 625.67, 137/625.25
    See application file for complete search history.

(56) References Cited

U.S. PATENT DOCUMENTS

| | | | | |
|---|---|---|---|---|
| 2008/0087345 | A1* | 4/2008 | Tabor | F15B 13/0402 137/625.65 |
| 2008/0163837 | A1* | 7/2008 | Daut | F16K 31/0613 123/90.17 |
| 2009/0057588 | A1 | 3/2009 | Reilly | |
| 2014/0361206 | A1* | 12/2014 | Holmes | F16K 31/0613 251/129.15 |

FOREIGN PATENT DOCUMENTS

| | | |
|---|---|---|
| DE | 10 2012 222 399 | 6/2014 |
| DE | 10 2013 014 558 | 3/2015 |

* cited by examiner

VALVE, IN PARTICULAR PROPORTIONAL PRESSURE REGULATING VALVE

FIELD OF THE INVENTION

A valve, in particular a proportional pressure regulating valve, has a spring-loaded valve piston that is guided in a longitudinally displaceable manner and is actuated by an energizable actuating magnet within a valve housing. Dependent on its displacement position, the valve piston establishes or shuts off again a fluid-conducting connection between a pump connection and a working connection and between this working connection and a tank connection in the valve housing. Face sides of the valve piston that are situated opposite one another are permanently pressurized with the pressure of the tank connection. The valve piston has a pressure-active regulation surface, which can be connected in a fluid-conducting manner to the working connection for the generation of the regulation pressure. An annular space is in the valve housing, into which annular space the working connection opens in a radial or axial direction.

BACKGROUND OF THE INVENTION

Such valves are already known. For example, document DE 10 2005 022 693 A1 relates to a valve, in particular a proportional pressure limitation valve, having an electrically actuatable magnet system for the actuation of an actuation part, which cooperates with a valve element. The valve element is guided in a longitudinally displaceable in a valve housing and, in one of its opening positions, releases a fluid-conducting connection path between a fluid inlet and a fluid outlet. In its shut position, the valve piston shuts off this path. An energy store, preferably in the form of a compression spring, is arranged between the actuation part and the valve element at a clearance therefrom. The energy store seeks to hold the valve element in the direction of its closed position. The actuation part is designed as a guide piston, which has a longitudinal guide for the valve element. The known solution ensures that the valve element with its closure part, which, preferably having a seat design, cooperates with a valve seat in the valve housing, always arrives at its envisaged closed position in an axis-precise manner. Any angular displacement with leakage in the region of the valve seat is then reliably prevented. The known valve in principle functions in a force-controlled manner. Any undesirable dynamic effects occurring during operation of the valve are compensated for by the energy store in the form of the compensation spring.

Another valve in the form of a typical proportional pressure regulating valve is disclosed by document DE 10 2013 014 558 A1. In this known valve solution, the respective differential pressure, which is generated during passage through the additional fluid-conducting connection between the utility connection and the tank connection, acts by an actuating device on the valve piston. The valve piston, counteracting a stop position, from which position the additional fluid-conducting connection is increasingly inhibited, then passes into a fully opened open position in which, relative to the stop position, an enlarged opening cross section from the utility connection to the tank connection is achieved. An opportunity is then created to increase the valve piston stroke without having to tolerate the start-up jump of the P-I characteristic curve. The known valve can then generate a very large opening cross section when releasing a clutch connected to the valve, and nevertheless can ensure a rapid disengagement of the clutch. In this way, the clutch of a vehicle, for example, can be smoothly released, which represents a significant safety aspect, in particular in the case of mobile work machines.

Such proportional pressure regulating valves can be designed such that they generate the maximum regulation pressure without energizing of the actuating magnet system. In technical terms, this generation is expressed as these valves having a failsafe characteristic curve. With increasing current at the actuating magnet, the regulation pressure drops in a continuous manner. They are therefore frequently used for applications in which, in the case of a power outage, a safe state is obtained only when the maximum regulation pressure is applied at the consumer. It is then possible, for example, to actuate clutches that are pressurized in a de-energized manner. As a general rule however, such valves are very frequently equipped with a pilot control.

SUMMARY OF THE INVENTION

On the basis of this prior art, the problem addressed by the invention is to realize, preferably in a cost-effective manner, a proportional pressure regulator with a falling characteristic curve.

This problem is basically solved by a valve having its pressure-active regulation surface formed on the valve piston at the transition point between the annular space and the mouth of the working connection. In the de-energized state of the actuating magnet, a maximum regulation pressure can be generated. A respective adjustment state is then produced between the force of a compression spring of the spring-loaded valve piston and the regulation pressure applied at the regulation surface of the valve piston. The regulation pressure of the valve drops linearly over a settable pressure range with increasing energizing of the actuating magnet system. The valve according to the invention is therefore a solution in which a failsafe pressure regulator is realized in a directly controlled manner.

The regulation pressure is measured only at a diameter jump, which forms a pressure-active regulation surface on the regulation piston or valve piston and namely in the region of the respective working connection in the valve housing. All other piston face sides of the valve piston or regulation piston are by contrast essentially pressurized with the tank pressure. In a de-energized manner, a kind of equilibrium is then obtained between the spring force of the to this extent spring-loaded valve piston and the regulation pressure applied at the circular ring in the form of the diameter jump on the valve piston. If the actuating magnet system is energized, then a portion of this spring force that increases with increasing current is compensated for by the magnetic force of the actuating magnet system, and the regulation pressure drops in a preferably linear manner. In order to realize the solution according to the invention, in a particularly preferable manner, a cost-effectively realizable, oppressive magnet system can preferably be used.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and are schematic and not to scale:

FIG. 3 is a P-I characteristic curve progression graph as a falling characteristic curve, as can be achieved with the valves according to FIGS. 1 and 2.

DETAILED DESCRIPTION OF THE INVENTION

Figure 1:
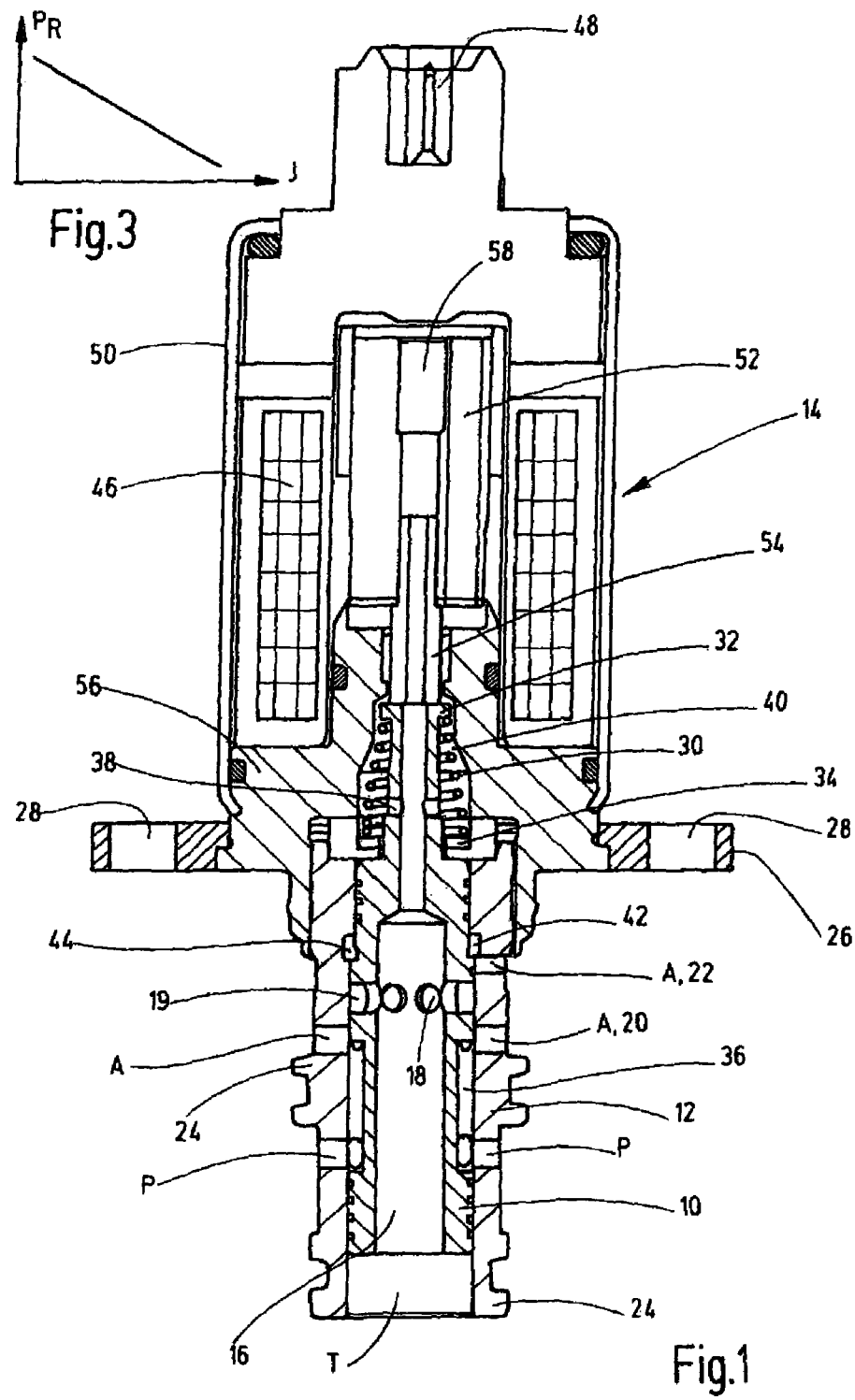
FIG. 1 is a side view in section of a valve according to a first exemplary embodiment of the invention.

FIG. 1 shows, in a longitudinal section, the valve according to the invention, in particular in the form of a proportional pressure regulating valve, having a spring-loaded valve piston 10. Valve piston 10 is guided in a longitudinally displaceable manner and in a manner actuated by an energizable actuating magnet 14 within a valve housing 12. Depending on the displacement position of the valve piston 10, the valve piston selectively permits a fluid-conducting connection between a pump connection P and a working connection A and between this working connection A and a tank connection T. The valve piston 10 is formed as a hollow piston starting from the face-side tank connection T on the valve housing 12 and is provided with a continuous central channel 16, which opens radially into a transverse channel 18, which discharges into an annular groove 19 in the valve piston 10. The annular groove 19 is between, at least in the de-energized state of the actuating magnet 14 and in the position depicted in FIG. 1, two channel sections 20, 22 of the working connection A in the valve housing 12.

As can also be seen from FIG. 1, connections P and A can have several radial bores, which penetrate the valve housing 12 at the external circumference. The valve housing 12 is designed with a shell or cartridge construction and has crossbars 24 on the external circumference which, lying adjacent one another in pairs, delimit between them a receiving groove for receiving an annular sealing- and guiding system that is not depicted in detail. The valve housing 12 can then be accommodated in the bore of a valve block (not depicted). The actuating magnet 14 with a flange plate 26 can be mounted on the valve block from the outside and can be correspondingly screwed to this block by through holes 28.

A compression spring 30 serves for the spring loading of the valve piston. The compression spring 30 is conically tapered upwards, when viewed in the viewing direction of FIG. 1 and is supported with its one free, top end on a radial broadening 32 of the valve piston 10 and with its other free, bottom end abutting parts 34 of the valve housing 12. The compression spring 30 is penetrated by parts of the valve piston 10, which valve piston in this regard tapers correspondingly in a stepped manner with respect to its diameter in the direction of the broadening 32. The valve piston 10 additionally has a longitudinal groove 36 at the external circumference, which longitudinal groove, in a manner dependent on the displacement position of the valve piston 10, permits a fluid-conducting connection between the pressure connection P and the bottom working connection A or the respective channel section 20. In the region of the tapered top section of the valve piston 10, the central channel 16 thereof is interrupted by a transverse channel 38, which opens into a spring space 40, in which the compression spring 30 is accommodated.

Viewed in the viewing direction of FIG. 1, the top channel section 22 on the circumference of the utility connection A furthermore opens into an expanding annular channel or annular space 42 in the valve housing 12. The valve piston 10 has a pressure-active regulation surface 44 in its displacement position depicted in FIG. 1 at this transition point between the annular space 42 and the top channel section 22 of the utility connection A. As can be seen from the connection configuration for the valve according to FIG. 1, the face sides of the valve piston 10 that are situated opposite one another are then permanently pressurized with the pressure of the tank connection T. As already described, the valve piston 10 has the pressure-active regulation surface 44, which can be connected in a fluid-conducting manner to the working connection A, as depicted, to generate the regulation pressure $P_R$ on the valve piston 10. In the de-energized state of the actuating magnet 14, a maximum regulation pressure $P_R$ can then be generated, in which a respective adjustment state between the force of the compression spring 30 of the spring-loaded valve piston 10 and the regulation pressure $P_R$ applied at the regulation surface 44 of the valve piston 10 is produced during operation of the valve. With increasing current I at the actuating magnet 14, the increasing portion of the spring force of the compression spring 30 is compensated for by the magnetic force of the actuating magnet 14, and the regulation pressure $P_R$ drops, as is apparent from the depiction according to FIG. 3.

The actuating magnet 14 has a coil winding 46 in a manner that is standard and therefore not described in detail. The coil winding can be energized from the outside via a connector part 48. The entire actuating magnet 14 is encapsulated in a pressure-tight manner by a housing part 50. On the inside, a longitudinally displaceable keeper 52 is provided, which keeper acts via an operating plunger 54 having direct contact directly on the valve piston 10. The actuating magnet 14 is designed as an oppressive magnet, i.e., when the coil winding 46 is energized, the keeper 52 travels, viewed in the viewing direction of FIG. 1, out of its de-energized state depicted therein in a downwards direction and also displaces the valve piston 10 downwards counteracting the action of the compression spring 30. For this power transmission, the valve housing 12 for the valve piston 10 is integrated into a bottom housing part 56 of the actuating magnet 14. For the purpose of unimpeded operation of the keeper 52 and in order to achieve a pressure balance within the overall valve system, the keeper 52 is centrally penetrated by a continuous hollow channel 58 that, as depicted, is permanently connected in a fluid-conducting manner to the continuous channel 16 of the valve piston 10.

The regulation pressure $P_R$ is measured at the diameter jump at the valve piston 10 in the form of the regulation surface 44, with all other piston face sides being pressurized with the tank pressure. If the actuating magnet 14 is de-energized, a balance is then obtained between the compression spring 30 and the regulation pressure $P_R$ applied at the circular ring, or the regulation surface 44. If the coil winding 46 is now energized, then a portion of the compression spring that increases with increasing current is compensated for by the magnetic force of the actuating magnet 14, and the regulation pressure $P_R$ drops, as is depicted in FIG. 3 by the P-I-characteristic curve.

The valve solution according to the invention then permits realizing in a cost-effective manner a proportional pressure regulator with a falling characteristic curve according to the exemplary depiction of FIG. 3.

Figure 2:
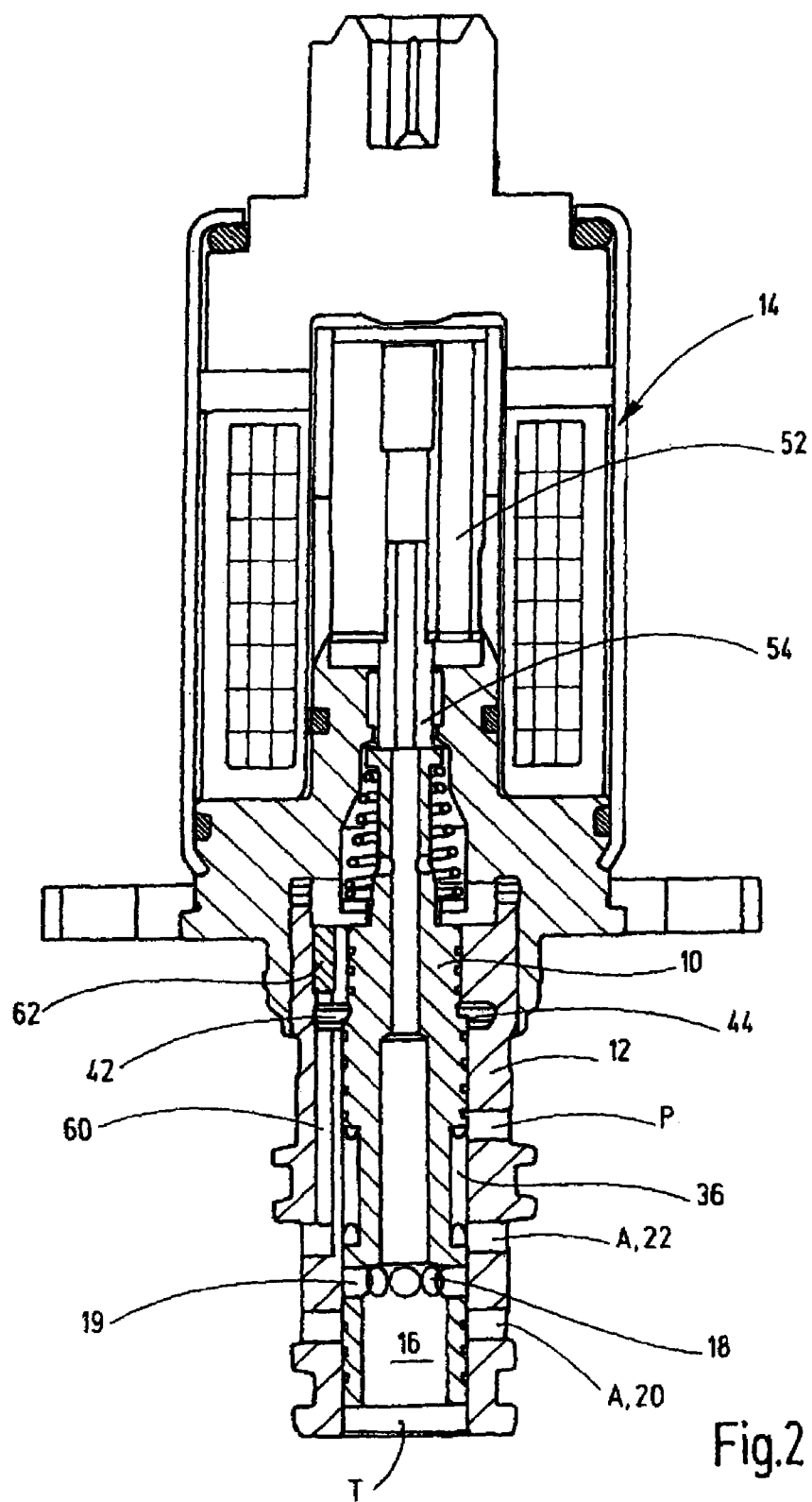
FIG. 2 is a side view in section of a valve according to a second exemplary embodiment of the invention.

The second embodiment of the valve according to the invention in accordance with FIG. 2 is explained below only to the extent that it differs significantly from the previous exemplary embodiment according to FIG. 1. The statements made above with regards to the embodiment according to FIG. 1 also apply to the embodiment according to FIG. 2, and components which correspond to one another are referenced with the same references.

In the embodiment according to FIG. 2, the tank connection T is again located at the bottom axial inlet opening of the valve housing 12. By contrast with the valve solution according to FIG. 1, starting from the tank connection T, the two working connections A with their respective corresponding channel sections 20, 22 then follow. Following this and situated lying above, the pump connection P is arranged in the valve housing 12. A longitudinal channel 60 is connected inside the valve housing 12 to the channel section 22 at the top viewed in the viewing direction of FIG. 2. The longitudinal channel 60 enters in the upwards direction into the expanded annular channel or annular space 42 arranged in the valve housing 12. In this region of the annular space 42, in accordance with the depiction of FIG. 2, the diameter reduction with the regulation surface 44 is again provided on the valve piston 10. To this extent, by the regulation surface 44 the pressure applied in the utility connection A is again activated or adjusted via the longitudinal channel 60 extending vertically upwards inside the annular space 42.

Also in the present exemplary embodiment, the central channel 16 of the hollow piston as a valve piston 10 opens in the radial direction into the transverse channel 18, which is in turn delimited inside the valve piston 10 towards the outside by an annular groove 19. This transverse channel 18 with the annular groove 19 is again arranged in the exemplary embodiment according to FIG. 2 between the two channel sections 20, 22 of the utility connection A. This time, however, the utility connection A is at the bottom end of the valve housing 12 and in the opposite direction to the exemplary embodiment according to FIG. 1. The already described longitudinal groove 36, which extends in a hollow cylindrical manner at the external circumference of the valve piston 10, in accordance with the circuit depiction in FIG. 2 in turn ends at the end between the pump connection P and the top utility connection A with the channel-like section 22.

The longitudinal channel 60 is arranged for the purpose of its production as an overall longitudinal bore in the valve housing 12. Channel 60 discharges upwards in the direction of the spring space 40, with it being closed in a pressure-tight manner in this discharge region by a blind plug 62. Because, in principle, the valve piston 10 is only actuated by the regulation pressure PR at the regulation surface 44, it can act very promptly in a regulating manner on a hydraulic control circuit, so that regulating delays or switching delays during operation of the valve are avoided.

While various embodiments have been chosen to illustrate the invention, it will be understood by those skilled in the art that various changes and modifications can be made therein without departing from the scope of the invention as defined in the claims.

The invention claimed is:

1. A valve, comprising:
a valve housing having a pump connection, a working connection and a tank connection;
a valve piston biased by a compression spring and movable in and along a longitudinal axis of said valve housing selectively connecting and disconnecting fluid communication of said working connection with said pump connection and said tank connection, in different connection positions of said valve piston along said longitudinal axis in said valve housing, opposite axially facing sides of said valve piston being permanently connected to said tank connection in fluid communication such that said opposite axially facing sides are at tank pressure;
an annular space in said valve housing, said working connection opening into said annular space in a radial or axial direction;
an actuating magnet coupled to said valve piston and moving said valve piston in said valve housing between the connection positions of said valve piston in opposition to biasing of said compression spring; and
a pressure-active regulation surface on said valve piston being connected in fluid communication to said working connection generating a regulation pressure and being at a transition point between said annular space and a mouth of said working connection, a maximum regulation pressure being generated producing a respective adjustment state applying an axial force on said valve piston in opposition to the spring force of said compression spring with the regulation pressure applied at said regulation surface of said valve piston in a de-energized state of said actuating magnet.

2. A valve according to claim 1 wherein
said valve housing, said valve piston, said annular space, said actuating magnet and said pressure-active regulating pressure regulation surface form a proportional pressure regulating valve.

3. A valve according to claim 1 wherein
an increasing portion of the spring force is compensated by a magnetic force of said actuating magnet with increasing current at the actuating magnet.

4. A valve according to claim 1 wherein
said actuating magnet moves said valve piston against biasing of said compression spring and moves said valve piston with increasing energy of said actuating magnet towards said tank connection increasingly closing fluid communication between said pump connection and said working connection.

5. A valve according to claim 1 wherein
said pressure-active regulation surface is formed by a change in outer diameter of said valve piston and is at least partially movable in said annular space in said valve housing, said working connection opening into said annular space in a radial or axial direction to provide fluid communication therebetween.

6. A valve according to claim 1 wherein
said compression spring comprises a first free end abutting against said valve piston and a second free end abutting against parts of said valve housing, said valve piston extending through said compression spring.

7. A valve according to claim 1 wherein
said actuating magnet comprises an operating plunger abutting an end of said valve piston remote from said tank connection.

8. A valve according to claim 1 wherein
said valve piston comprises a longitudinal groove on an exterior circumference of said valve piston providing fluid communication between said pump connection and said working connection of the respective connection position of said valve piston.

9. A valve according to claim 1 wherein
said valve piston has a cross-sectional width within said annular space that is less than a cross-sectional width of said pressure-active regulation surface.

10. A valve according to claim 1 wherein
said valve piston has a cross-sectional width within said annular space not greater than a narrowest cross-sectional width point of said pressure-active regulation surface.

11. A valve according to claim 1 wherein
said valve piston has a cross-sectional width less than a cross-sectional width of said pressure-active regulation surface along an entire length portion of said valve piston extending from said pressure-active regulation surface in a direction away from said tank port.

12. A valve according to claim 1 wherein
said valve piston has a cross-sectional width not greater than a narrowest cross-sectional width point of said pressure-active regulation surface along an entire length portion of said valve piston extending from said pressure-active regulation surface in a direction away from said tank port.

13. A valve according to claim 1 wherein
said valve piston comprises a continuous channel extending from said tank connection and opening radially into a transverse channel discharging into an annular groove being delimited by edges between first and second channels of said working connection in the de-energized state of said actuating magnet.

14. A valve according to claim 13 wherein
said actuating magnet comprises a keeper having a continuous hollow channel permanently connected in fluid communication with said continuous channel of said valve piston.

* * * * *